US012339527B2

(12) United States Patent
Alster et al.

(10) Patent No.: US 12,339,527 B2
(45) Date of Patent: Jun. 24, 2025

(54) ASTIGMATISM CORRECTING CONTACT LENSES HAVING SMOOTH EDGES, SPHERIC AND/OR ASPHERIC GEOMETRICAL DESIGN

(71) Applicant: JOURNEY1, Inc., South San Francisco, CA (US)

(72) Inventors: Yair Alster, Tel Aviv (IL); Eugene De Juan, Jr., San Francisco, CA (US); Omer Rafaeli, Rishpon (IL); Barak Azmon, Tel Aviv (IL); Iris Szwarcfiter Brand, Tel Aviv (IL)

(73) Assignee: Journey1 Inc, South San Francisco, CA (US)

( * ) Notice: Subject to any disclaimer, the term of this patent is extended or adjusted under 35 U.S.C. 154(b) by 0 days.

(21) Appl. No.: 18/908,397

(22) Filed: Oct. 7, 2024

(65) Prior Publication Data

US 2025/0116886 A1    Apr. 10, 2025

Related U.S. Application Data

(60) Provisional application No. 63/574,027, filed on Apr. 3, 2024, provisional application No. 63/560,974, filed on Mar. 4, 2024, provisional application No. 63/588,645, filed on Oct. 6, 2023.

(51) Int. Cl.
*G02C 7/04* (2006.01)
(52) U.S. Cl.
CPC ......... *G02C 7/049* (2013.01); *G02C 2202/06* (2013.01)

(58) Field of Classification Search
CPC .................... G02C 7/049; G02C 2202/06
USPC ................. 351/41, 159.01, 159.02
See application file for complete search history.

(56) References Cited

U.S. PATENT DOCUMENTS

| | | | |
|---|---|---|---|
| 6,176,577 B1 * | 1/2001 | Monnoyeur | G02C 7/02 351/159.2 |
| 6,843,563 B2 | 1/2005 | Richardson | |
| 10,001,660 B1 * | 6/2018 | Chow | G02C 7/027 |
| 10,302,968 B2 * | 5/2019 | Waite | G02C 7/04 |
| 2002/0060776 A1 | 5/2002 | Hodur et al. | |
| 2003/0103187 A1 | 6/2003 | Miyamura et al. | |
| 2022/0350168 A1 | 11/2022 | Rafaeli et al. | |

FOREIGN PATENT DOCUMENTS

WO    WO2023-177652    9/2023

OTHER PUBLICATIONS

NPL—International Search Report issued on Dec. 11, 2024 in respect of PCT/US2024/050217.

* cited by examiner

*Primary Examiner* — Tuyen Tra
(74) *Attorney, Agent, or Firm* — Mark S. Cohen; PEARL COHEN ZEDEK LATZER BARATZ LLP

(57) ABSTRACT

The invention provides an axisymmetric soft contact lens having aspheric and/or spheric geometrical design for use in correcting an ocular refractive error of an eye.

96 Claims, 6 Drawing Sheets

ASTIGMATISM CORRECTING CONTACT LENSES HAVING SMOOTH EDGES, SPHERIC AND/OR ASPHERIC GEOMETRICAL DESIGN

CROSS REFERENCE TO RELATED APPLICATIONS

This application claims the benefit of U.S. Ser. No. 63/588,645, filed on Oct. 6, 2023, and/or U.S. Ser. No. 63/560,974, filed on Mar. 4, 2024, and/or U.S. Ser. No. 63/574,027, filed on Mar. 4, 2024, which are incorporated in their entirety herein by reference.

BACKGROUND OF THE INVENTION

Refractive errors are a common eye condition that occur when the eye's shape prevents light from focusing directly on the back of the eye, resulting in blurry vision among other symptoms. Refractive errors include astigmatism, myopia, and/or presbyopia. For those having one or more refractive errors, more specialized contact lenses with additional features and corrections may be needed to correct the one or more refractive errors.

Astigmatism is a visual imperfection in the curvature of the eye that causes blurred distance and near vision. Astigmatism occurs when either the cornea or the lens has mismatched curves (instead of having one spheric curve, the surface changes its curvature like the shape of an egg). This causes blurred vision at all distances (normal, near or farsighted visions).

Such refractive errors may be corrected by eyeglasses, contact lenses, and/or surgery. People who have an astigmatic cornea may require a contact lens that correct for different refractive errors in at least two meridians. Additionally, those people who have such refractive errors and who use contact lenses can have many different spherical optical powers. The optical power at each meridian, the angle of a specific meridian, and/or the diameter across which the optical power difference occurs often differs from one individual to another.

Due to the additional fitting criteria, a large variety of specialized contact lenses meeting corrective criteria need to be manufactured and stored. In addition, the fitting of these specialized contact lenses may be more time-consuming than fitting of conventional contact lenses. Further, current contact lenses may not be suitable to correct one or more refractive errors to a high degree of satisfaction due to the complexity of the refractive errors.

Current treatments for such corneal irregularities, utilizing soft contact lenses involve contact lenses with multiple base curves and features allowing alignment and rotation to the wearer's specific astigmatism axis. Examples include structural elements like prism ballast and dynamic stabilization elements. These lenses, commonly referred to as toric lenses, often require the manufacture of multiple lenses for each power difference and angle between meridians.

It is generally assumed that opposite meridians have similar curvatures, and a shift of +/−5 degrees is usually not very noticeable. Therefore, with 10-degree axis steps, 18 lenses steps are typically needed for each sphere (ranging from +6.0 D to −6.0 at 0.25 D steps) and cylindrical power combination (usually 0.75 D to 2.5 D relative to sphere) to cover various astigmatisms a patient may have. This results in the production of thousands of different lenses. Consequently, there is a need for solutions to minimize the number of distinct contact lenses that must be manufactured and stored.

To address this challenge, a lens for astigmatism correction was developed. This lens is designed to remain relatively flat over the cornea's flat meridian and vaulted over the steep meridian, regardless of its rotational status. Maintaining the spherical position of the soft contact lens over the aspheric cornea requires unimpeded fluid flow. While grooves can enhance fluid conductivity, considerations regarding the Geometry, Base curves, the transition between base curves, profiles, distribution and location of grooves and fenestrations are crucial to maintaining and improving the lens's comfort and functionality.

There are therefore needs for solutions to reduce the number of different contact lenses needed to be manufactured and stored, as well as to improve the treatment options for patients with astigmatism or other optical aberrations in general.

SUMMARY OF THE INVENTION

The invention is based on clinical evidence which demonstrate that to create a lens that would effectively mask astigmatism two critical elements are required: Fluid exchange and adequate lens geometry. It was found that certain geometries allow for optimal masking while others do not.

The lens requires at least one of the following two elements; a central portion that enables the lens structure to vault over some portions of the cornea, and a peripheral portion which allows good exchange of fluids through the lens' edges; outwards once blinking occurs and inwards between blinks. In addition, it was found that coupling a geometry with features that enhance fluid enterer under the lens (e.g. fenestrations) and/or grooves on the posterior surface to enhance fluid distribution under the lens, improves the masking performance of the lens.

The present invention provides a soft contact lens for correcting an ocular refractive error of an eye, one aspect the invention comprising: a soft continuous lens body configured to cover a corneal surface of the eye having an anterior and posterior surface; and wherein said contact lens has a central thickness of between about 80 microns to about 350 microns; and wherein the soft contact lens is axisymmetric; wherein said soft continuous lens body having at least a central aspheric portion and a peripheral aspheric portion; wherein said central aspheric portion has a base curve of less than 9 mm in its center and a base curve of less than 8 mm in its edge; and wherein said peripheral aspheric portion has a base curve in its proximal end that is larger than 8 mm and a base curve in its distal end that is larger than 8.5 mm; wherein at least a portion of the posterior surface of the soft lens body is configured to be suspended above a corneal surface of the eye when placed thereon forming a free volume between the posterior surface of the soft lens body and the corneal surface; and wherein at least a portion of the free volume is configured to be filled with tear fluid to form a tear lens over the corneal surface thereby correcting an ocular refractive error of the eye.

In another aspect the invention provides a soft contact lens for correcting an ocular refractive error of an eye, comprising: a soft continuous lens body configured to cover a corneal surface of the eye having an anterior and posterior surface; and wherein said contact lens has a central thickness of between about 80 microns to about 350 microns; and wherein the soft contact lens is axisymmetric; wherein said soft lens body having at least a central aspheric portion and a peripheral spheric portion; wherein said central aspheric portion has a base curve of less than 9 mm in its center and a base curve of less than 8 mm in its edge; and wherein said peripheral spheric portion has a base curve that is larger than 8.5 mm wherein at least a portion of the posterior surface of the soft lens body is configured to be suspended above a corneal surface of the eye when placed thereon forming a free volume between the posterior surface of the soft lens body and the corneal surface; and wherein at least a portion of the free volume is configured to be filled with tear fluid to form a tear lens over the corneal surface thereby correcting an ocular refractive error of the eye.

In another one of its aspects the invention provides a soft contact lens for correcting an ocular refractive error of an eye, comprising: a soft continuous lens body configured to cover a corneal surface of the eye having an anterior and posterior surface; and wherein said contact lens has a central thickness of between about 80 microns to about 350 microns; and wherein said soft lens body having at least a central spheric portion and a peripheral aspheric portion; wherein said central spheric portion a base curve being less than 9 mm; and wherein said peripheral aspheric portion has a base curve being larger than 8 mm in its proximal end and a base curve that is larger than 8.5 mm in its distal end; wherein at least a portion of the posterior surface of the soft lens body is configured to be suspended above a corneal surface of the eye when placed thereon forming a free volume between the posterior surface of the soft lens body and the corneal surface; and wherein at least a portion of the free volume is configured to be filled with tear fluid to form a tear lens over the corneal surface thereby correcting an ocular refractive error of the eye.

In an further aspect the invention provides a soft contact lens for correcting an ocular refractive error of an eye, comprising: a soft continuous lens body configured to cover a corneal surface of the eye having an anterior and posterior surface; and wherein said contact lens has a central thickness of between about 80 microns to about 350 microns; and wherein said soft lens body having at least a central spheric portion and a peripheral spheric portion; wherein said central spheric portion a base curve being less than 9 mm; and wherein said peripheral spheric portion has a base curve that is larger than 8.5 mm; wherein at least a portion of the posterior surface of the soft lens body is configured to be suspended above a corneal surface of the eye when placed thereon forming a free volume between the posterior surface of the soft lens body and the corneal surface; and wherein at least a portion of the free volume is configured to be filled with tear fluid to form a tear lens over the corneal surface thereby correcting an ocular refractive error of the eye.

The invention further provides a soft contact lens for correcting an ocular refractive error of an eye, comprising: a soft continuous lens body configured to cover a corneal surface of the eye having an anterior and posterior surface; and wherein said contact lens has a central thickness of between about 80 microns to about 350 microns; and wherein the soft contact lens is axisymmetric; wherein said soft continuous lens body having at least a central aspheric portion and a peripheral aspheric portion;
  wherein said central aspheric portion has a base curve of less than 20 mm in its center and a base curve of less than 15 mm in its edge; and wherein said peripheral aspheric portion has a base curve in its proximal end that is larger than 20 mm and a base curve in its distal end that is larger than 5 mm;
  wherein at least a portion of the posterior surface of the soft lens body is configured to be suspended above a corneal surface of the eye when placed thereon forming a free volume between the posterior surface of the soft lens body and the corneal surface; and wherein at least a portion of the free volume is configured to be filled with tear fluid to form a tear lens over the corneal surface thereby correcting an ocular refractive error of the eye.

The invention further provides a soft contact lens for correcting an ocular refractive error of an eye, comprising: a soft continuous lens body configured to cover a corneal surface of the eye having an anterior and posterior surface; and wherein said contact lens has a central thickness of between about 80 microns to about 350 microns; and wherein the soft contact lens is axisymmetric; wherein said soft lens body having at least a central aspheric portion and a peripheral spheric portion;
  wherein said central aspheric portion has a base curve of less than 20 mm in its center and a base curve of less than 15 mm in its edge; and wherein said peripheral spheric portion has a base curve that is larger than 5 mm;
  wherein at least a portion of the posterior surface of the soft lens body is configured to be suspended above a corneal surface of the eye when placed thereon forming a free volume between the posterior surface of the soft lens body and the corneal surface; and wherein at least a portion of the free volume is configured to be filled with tear fluid to form a tear lens over the corneal surface thereby correcting an ocular refractive error of the eye.

The invention further provides a soft contact lens for correcting an ocular refractive error of an eye, comprising: a soft continuous lens body configured to cover a corneal surface of the eye having an anterior and posterior surface; and wherein said contact lens has a central thickness of between about 80 microns to about 350 microns; and wherein said soft lens body having at least a central spheric portion and a peripheral aspheric portion;
  wherein said central spheric portion a base curve being less than 20 mm; and wherein said peripheral aspheric portion has a base curve being larger than 5 mm in its proximal end and a base curve that is larger than 5 mm in its distal end;
  wherein at least a portion of the posterior surface of the soft lens body is configured to be suspended above a corneal surface of the eye when placed thereon forming a free volume between the posterior surface of the soft lens body and the corneal surface; and wherein at least a portion of the free volume is configured to be filled with tear fluid to form a tear lens over the corneal surface thereby correcting an ocular refractive error of the eye.

The invention further provides a soft contact lens for correcting an ocular refractive error of an eye, comprising: a soft continuous lens body configured to cover a corneal surface of the eye having an anterior and posterior surface; and wherein said contact lens has a central thickness of between about 80 microns to about 350 microns; and wherein said soft lens body having at least a central spheric portion and a peripheral spheric portion;
  wherein said central spheric portion a base curve being less than 20 mm; and wherein said peripheral spheric portion has a base curve that is larger than 5 mm;
  wherein at least a portion of the posterior surface of the soft lens body is configured to be suspended above a corneal surface of the eye when placed thereon forming a free volume between the posterior surface of the soft lens body and the corneal surface; and wherein at least a portion of the free volume is configured to be filled with tear fluid to form a tear lens over the corneal surface thereby correcting an ocular refractive error of the eye.

The invention further provides a lens for correcting a refractive error, wherein said lens has a lens body having a lens surface and at least one discrete discontinuity within such surface; and wherein said at least one discrete discontinuity is transitioned on said lens surface with at least one transition radius; and wherein said at least one transition radius has a base curve of more than 1 mm. In some embodiments, said base curve is between about 1 mm to 4 mm. In other embodiments, said base curve is about 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4 mm.

also a few base curves to fit the cornea, and the one number that is reflects the combination of base curves is the EBC (Equivalent Base Curves)

Equivalent Base Curves (EBC) refer to the concept of matching the base curve of a contact lens to the curvature of the cornea to ensure a proper fit. This is crucial for comfort, vision quality, and eye health. EBC reflects in a single parameter, the equivalent of all base curves. A lens that has a few (more than one) base curves and a lens the has its Equivalent Base Curves (EBC) has the same total curvature, in terms of same sagittal height from their base to the apex. The EBC value of a lens is calculated as the following:

$$EBC=((Rbc*Abc)+(Rpc*Apc))/(Abc+Apc)$$

Rbc=Radius of central base curve (mm)
Abc=Area of central base curve (%)
Rpc=Radius of peripheral base curve (mm)
Apc=Area of peripheral base curve (%)

For example, a lens with the following variables has the calculated EBC of 8.57 [EBC=((7.86*0.51)+ (9.32*0.49))/(0.51+0.49)]

| Central Curve (mm) | Periphery curve TC (mm) | Transition point ANT $t_p$ (mm) | CL diameter (mm) | Lens overall R | PERIPHERY SURFACE AREA % | EBC |
|---|---|---|---|---|---|---|
| 7.86 | 9.32 | 5.20 | 14.50 | 7.25 | 0.49 | 8.57 |

| Optical surface area | Overall surface area | Periphery surface area | OPTICL SURFACE AREA % |
|---|---|---|---|
| 84.95 | 165.13 | 80.18 | 0.51 |

As used herein the terms "angular grooves" and "smoothed transition" are used interchangeably. Also, "transition radius" and "fillet" and "radiused edges" are used interchangeably herein.

Features such as discrete discontinuities (e.g. grooves and fenestration) have edges which are the transition between the anterior or posterior surface of the lens and the discrete discontinuity. Such edges have a geometry which may affect the function and/or comfort of the lens. To improve the comfort of the contact lens, such edges may be radiused which that will soften the transition from surface of the lens to the geometry of the features. Without radiused edges, the features may have sharp corners (e.g. a vertex) which can irritate the eyelid and/or cornea. The radiused edges may distribute the pressure of the lens on the eye over a wider area and allow for movement of the lens or over the lens minimizing friction with the cornea and/or eye lid. These radiused edges may be uniform along the entire edge of the discrete discontinuity or have one or more different radii along the edge of the discrete discontinuity (e.g. larger radius in vertical meridian relative to the lid movement). These edges may have a progressively variable radius of curvature along the length of a groove. These radiused edges may facilitate improved fluid flow through fenestration. These radiused edges may facilitate fluid flow along a groove.

The angular edges, may have a range from 1.0 mm to 4.0 mm or more. In some cases, these radiused edges may have a range from 0.5 mm to 8.0 mm or less. In some cases these radiused edges may have a radius of curvature that is 0.5 mm, 1.0 mm, 1.5 mm, 2.0 mm, 2.5 mm, 3.0 mm, 3.5 mm. 4.0 mm, When fitting contact lenses, it should consider that the cornea has a few base curves. The contact lens may have In some embodiments, said lens body has an Equivalent Base Curve (EBC), wherein said EBC is between about 8.3 mm to 8.8 mm. In some embodiments, said lens body has an Equivalent Base Curve (EBC), wherein said EBC is about 8.3 mm. In some embodiments, said lens body has an Equivalent Base Curve (EBC), wherein said EBC is about 8.8 mm. In some embodiments, said lens body has an Equivalent Base Curve (EBC), wherein said EBC is about 8.4 mm. In some embodiments, said lens body has an Equivalent Base Curve (EBC), wherein said EBC is about 8.5 mm. In some embodiments, said lens body has an Equivalent Base Curve (EBC), wherein said EBC is about 8.6 mm. In some embodiments, said lens body has an Equivalent Base Curve (EBC), wherein said EBC is about 8.7 mm. In some embodiments, said lens body has an Equivalent Base Curve (EBC), wherein said EBC is about 8.8 mm.

When referring to "a soft contact lens" it should be understood to encompass thin lenses placed directly on the surface of the eyes that are made of soft, flexible polymers such as silicone, silicone hydrogel and hydrogel. Such a flexible polymers typically have a young's modulus of less than 5 mPa.

When referring to "a soft continuous lens body configured to cover a corneal surface of the eye" it should be understood that said soft contact lens has a shape and form that covers essential the corneal surface of the eye and having an anterior (the surface of the lens that does not come in direct contact with the eye surface) and posterior surface (the surface of the lens that does, at least partially, come in direct contact with the eye surface).

When referring to said contact lens having a central thickness of between about 80 microns to about 350 microns, it should be understood that said thickness of lens might be uniform or non-uniform throughout the portions and zones of the lens of the invention. In some embodiments said central thickness is at least about 80 microns. In some other embodiments, said central thickness is about 350 microns. In other embodiments, said central thickness is about 80, 85, 90, 95, 100, 110, 20, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, 300, 305, 310, 315, 320, 325, 330, 335, 340, 345, 350 microns.

When referring to wherein said soft lens body having at least a central portion and a peripheral portion it should be understood to relate to a central portion of the lens beginning from the center of the lens and a peripheral portion which is the outer most portion that surrounded the central portion and ends at the lens margins. In some embodiments, there may be additional portions between the central and the peripheral, In some embodiments, said central portion is aspheric (having a radius of curvature that varies from the center to the edge of the portion). In other embodiments, said central zone is spheric (having a radius of curvature that is uniform from the center to the edge of the portion). In some embodiments, said peripheral portion is aspheric (having a radius of curvature that varies from the proximal end to the distal end of the portion). In other embodiments said peripheral zone is spheric (having a radius of curvature that is uniform from the proximal to distal end of the portion). In some embodiments, said central portion is aspheric and said peripheral portion is aspheric. In some embodiments, said central portion is aspheric and said peripheral portion is spheric. In some embodiments, said central portion is spheric and said peripheral portion is aspheric. In some embodiments, said central portion is spheric and said peripheral portion is spheric.

When referring to a "discrete discontinuity" it should be understood to relate to a part of a surface of a lens of the invention having an isolated and distinct gap or cut-off section. In some embodiments said discrete discontinuity may be selected from a channel, a fenestration, a groove, an opening, a slit, a thin portion, or any combination thereof. In some embodiments, said discrete discontinuity is on the anterior surface of the lens of the invention. In other embodiments said discrete discontinuity is on the posterior surface of a lens of the invention. In further embodiments, said discrete discontinuity is positioned from the anterior to the posterior surfaces of a lens of the invention. In other embodiments, said discrete discontinuity is positioned from the posterior to the anterior surfaces of a lens of the invention.

In some embodiments, the contact lens for correcting a refractive error may have a continuous body. In some embodiments, the continuous body does not have a juncture (e.g., a living hinge). In some embodiments, the continuous body comprises a substantially uniform material, a substantially uniform rigidity, a substantially uniform tensile modulus, a substantially uniform tensile stress, or a substantially similar cross-sectional thickness at and near a transition, substantially uniform refractive index, or a combination thereof.

In some embodiments, a continuous body refers to the lens having little to no difference in thickness, modulus, and/or rigidity at or near a transition. In some embodiments, a continuous body refers to having a substantially smooth surface along one more axis or line from the center of the lens to the periphery of the lens.

In some embodiments, said refractive error of the eye, is selected from a refractive error of the eye, corneal irregularity, astigmatism, coma, 2nd order aberration and higher order aberration of the eye and any combinations thereof.

In some embodiments the lens is not axisymmetric.

In some embodiments the lens can be a uni-curve, a bi-curve, a tri-curve, or multi-curve lens.

In some embodiments, said soft lens body comprises at least one discrete discontinuity selected from a channel, a fenestration, a groove, an opening, a slit, a thin portion, or any combination thereof.

In some embodiments, said soft contact lens has a young modulus that is <4 Mpa.

In some embodiments, said refractive error is astigmatism. In some embodiments, refractive error is optical aberration of the cornea.

In some embodiments, said lens body has at least one discrete discontinuity that is at least one fenestration traversing between the anterior surface and the posterior surface.

In some embodiments, said soft lens body having an anterior surface, a posterior surface, and at least one fenestration traversing between the anterior surface and the posterior surface; in some embodiments the said at least one fenestration is positioned adjacent to a tear meniscus of the eye.

In some embodiments, said at least one fenestration is configured to be positioned adjacent the tear meniscus to promote flow of tear fluid therefrom to the free volume from adjacent the anterior surface of the lens body to the posterior surface of the lens body and to the free volume.

In some embodiments, said tear meniscus is one or more of an upper tear meniscus or a lower tear meniscus of the eye.

In some embodiments, at least one fenestration is configured to be positioned adjacent to the tear meniscus to promote flow of tear fluid to the free volume irrespective of an orientation of the lens body to the tear meniscus, when the lens body is applied over the corneal surface with the eyelid of the eye open.

In some embodiments, said at least one fenestration is configured to be positioned adjacent to the tear meniscus to promote flow of tear fluid to the free volume.

In some embodiments, at least one fenestration is configured to be positioned adjacent to the tear meniscus at a distance from about 0.0 mm to about 4.0 mm. In some embodiments, at least one fenestration is configured to be positioned adjacent to the tear meniscus at a distance of about 0.0, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0 mm.

In some embodiments, said at least one fenestration is positioned from about 3 mm to about 9 mm from a center of the lens body. In some embodiments, said at least one fenestration is positioned at about 3, 3.1.32, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0 mm from a center of the lens body.

In some embodiments, said soft contact lens and/or lens body comprises a plurality of fenestrations.

In some embodiments, plurality of fenestrations is evenly distributed around the center of the soft lens body.

In some embodiments, said plurality of fenestrations are distributed non-evenly around the center of the soft lens body.

In some embodiments, plurality of fenestrations are distributed circumferentially.

In some embodiments, said plurality of fenestrations are distributed radially.

In some embodiments, said plurality of fenestrations are separate from one another by a distance of about 1 mm. In some embodiments, said plurality of fenestrations are separate from one another by a distance of >1 mm.

In some embodiments, said plurality of fenestrations are distributed along at least one meridian of the soft lens body.

In some embodiments, said plurality of fenestrations are distributed radially in a radius of about 3 mm to about 9 mm. In some embodiments, said plurality of fenestrations are distributed radially in a radius of about 0.03, 3.5, 4.0, 4.5, 5.0, 5.5, 6.0, 6.5, 7.0, 7.5, 8.0, 8.5, 9.0 mm.

In some embodiments, said plurality of fenestrations are positioned from about 3 mm to about 9 mm from the center of the soft lens body. In some embodiments, said plurality of fenestrations are positioned from about 3.0, 3.5, 4.0, 4.5, 5.0, 5.5, 6.0, 6.5, 7.0, 7.5, 8.0, 8.5, 9.0 mm from the center of the soft lens body.

In some embodiments, plurality of fenestrations is distributed along a length of the soft lens body.

In some embodiments, said at least one fenestration has a cross-sectional area from about 0.0001 mm$^2$ to about 1 mm$^2$. In some embodiments, said at least one fenestration has a cross-sectional area of about 0.0001, 0.0005, 0.001, 0.0015, 0.002, 0.0025, 0.0030, 0.0035, 0.0040, 0.0045, 0.0050, 0.0055, 0.0060, 0.0065, 0.0070, 0.0075, 0.0080, 0.0085, 0.0090, 0.0095, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1.0 mm$^2$.

In some embodiments, said at least one fenestration has a cross-sectional area that is circular in shape. In some embodiments, said at least one fenestration has a cross-sectional area that is elliptic in shape. In some embodiments, said at least one fenestration has a cross-sectional area that some of it is rounded in shape.

In some embodiments, said central portion extends from the center of the lens to a radius of about 3 mm to 9.0 mm. In some embodiments, said central portion extends from the center of the lens to a radius of about 3.0, 3.5, 4.0, 4.5, 5.0, 5.5, 6.0, 6.5, 7.0, 7.5 8.0, 8.5, 9.0 mm.

In some embodiments, said peripheral portion extends starting at a radius from the center of the lens of about 3 mm to 12.0 mm. In some embodiments, said peripheral portion extends starting at a radius from the center of the lens of about 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0 mm.

In some embodiments, at least one fenestration is positioned from about 3 mm to about 9.0 mm from a center of the lens body.

In some embodiments said at least one fenestration comprises a plurality of fenestrations.

In some embodiments, the plurality of fenestrations is distributed circumferentially.

In some embodiments, the plurality of fenestrations is distributed radially.

In some embodiments, the plurality of fenestrations is distributed along at least one meridian of the soft lens body.

In some embodiments, the plurality of fenestrations is distributed along two meridians of the soft lens body, where the angle between them is between 45-135 degrees.

The present disclosure is generally directed to vision and treatment of the eye to provide improved vision. Although specific reference is made to coverings for vision correction such as soft contact lenses, embodiments of the present disclosure may comprise additional uses and applications such as the correction of a refractive error of an eye, such as, for example an astigmatism.

In one aspect, the present disclosure provides a soft contact lens for correcting an ocular refractive error of an eye. In some embodiments, the soft contact lens includes a soft continuous lens body configured to cover a corneal surface of the eye. In some embodiments, the soft continuous lens body has an anterior surface, a posterior surface, and at least one fenestration. In some embodiments, the at least a portion of the posterior surface of the soft continuous lens body is configured to be suspended above a corneal surface of the eye when placed thereon forming a free volume between the posterior surface of the soft continuous lens body and the corneal surface. In some embodiments, at least a portion of the free volume is configured to be filled with a fluid to form a tear lens over the corneal surface for correcting an ocular refractive error of the eye.

In some embodiments, at least a portion of the soft continuous lens body is suspended further above the corneal surface when compared with another portion of the of the soft continuous lens body. In some embodiments, at least a portion of the soft continuous lens body is suspended above the corneal surface and another portion of the soft continuous lens body conforms to the corneal surface.

The at least the portion of the soft continuous lens body may comprise a first portion of the soft continuous lens body suspended above the corneal surface and a different second portion of the soft continuous lens body suspended above the surface of the cornea further, closer, or the same as the first portion of the soft continuous lens body.

In some embodiments, the soft continuous lens body has a uniform Young's modulus. In some embodiments, the soft continuous lens body has Young's modulus from about 0.1 Megapascals ("MPa") to about 4 MPa.

In some embodiments, the ocular refractive error originates from one or more of a corneal irregularity, first order aberration-spherical, 2nd order aberration-astigmatism, or higher order aberration-such as coma and trefoil of the eye. In some embodiments, the ocular refractive error is an astigmatism of the eye.

In another aspect, the present disclosure provides a soft contact lens for correcting an astigmatism of an eye. In some embodiments, the soft contact lens includes a soft continuous lens body configured to cover a corneal surface of the eye.

In some embodiments, the soft continuous lens body has an anterior surface, a posterior surface, and at least one fenestration.

In some embodiments, the soft continuous lens body has a uniform Young's modulus from about 0.1 MPa to about 4 MPa.

In some embodiments, the at least a portion of the posterior surface of the soft continuous lens body is configured to be suspended above the corneal surface of the eye when placed thereon forming a free volume between the posterior surface of the soft continuous lens body and the corneal surface.

In some embodiments, at least a portion of the free volume is configured to be filled with a fluid to form a tear lens over the corneal surface for correcting an astigmatism of the eye.

In some embodiments, the anterior surface of the soft continuous lens body is axially symmetric. In some embodiments, the anterior surface comprises an anterior curvature profile. In some embodiments, the anterior curvature profile is axially symmetric. In some embodiments, the posterior surface of the soft continuous lens body is axially symmetric. In some embodiments, the posterior surface comprises a posterior curvature profile. In some embodiments, the posterior curvature profile is axially symmetric. In some embodiments, the soft continuous lens body further comprises a lens volume. In some embodiments, the lens volume is axially symmetric. In some embodiments, the lens does not provide a cylindric optical power when in a neutral state. In some embodiments, the lens corrects an ocular refractive error or an optical aberration of the eye when placed thereon irrespective of the orientation of the lens to a meridian of the eye. In some embodiments, the lens corrects an ocular refractive error or an optical aberration of the without being rotationally fit to the eye. In some embodiments, the optical aberration of the eye is a first order aberration or spherical aberration. In some embodiments, the optical aberration of the eye is a second order aberration or cylindrical aberration. In some embodiments, the optical aberration is a third order aberration or coma.

In some embodiments, the lens is made of a single material. In some embodiments, the lens is made of a single material having the same mechanical properties throughout. In some embodiments, the lens is made of a single polymeric material. In some embodiments, the lens is made of a hydrogel, silicone hydrogel, or silicone. In some embodiments, the lens is made of a single material selected from diacetone acrylamide, N,N-dimethylacrylamide, 2-hydroxyethyl methacrylate, methacrylic acid, methyl methacrylate, N-carboxl vinyl ester, N-vinyl pyrrolidone, poly[dimethylsiloxyl] di[silybutanol] bis[vinyl carbamate], phosphorylcholine, tris-(trimethylsiloxysilyl) propylvinyl carbamate, tris-(hydroxylmethyl) aminomethane, siloxane, or polyvinylpyrrolidone.

In some embodiments, the soft continuous lens body has a rigidity range from about 1.25E+04 Megapascal*micrometers cubed ("MPa*μm3") to about 5.00E+08 MPa*μm3.

In some embodiments, the soft continuous lens body comprises one or more optical regions and/or one or more non-optical regions. In some embodiments, the one or more optical regions are each independently defined by a ratio between a radius of curvature at the posterior surface and a radius of curvature at the anterior surface. In some embodiments, the one or more optical regions each independently provide a different optical power to the eye. In some embodiments, the one or more optical regions are a plurality of optical regions. In some embodiments, the one or more optical regions are either simultaneous or segmented. In some embodiments, the one or more simultaneous optical regions are either concentric (concentric circles of varying curvature) or aspheric (has varying curvature across the surface of the lens rather than a uniformly spherical shape).

In some embodiments, the lenses are bifocal or multifocal lenses.

In some embodiments, the diameter of the one or more optical regions is from about 4 millimeters ("mm") to about 15 mm.

In some embodiments, the radius of curvature at the posterior surface of the one or more optical regions is from about 7 mm to about 9 mm. In some embodiments, the radius of curvature at the anterior surface of the one or more optical regions is from about 5.5 mm to about 11.5 mm. In some embodiments, the ratio of the radius of curvature at the posterior surface and anterior surface of the one or more optical regions is from about 3:5 to about 2:1.

In some embodiments the soft continuous lens body has multiple base curves in-between the central and the peripheral base curves.

In some embodiments the radius of curvature at the posterior surface of the central spheric portion is less than 9 mm. In some embodiments, said central spheric portion is about 6.8, 6.9, 7.0, 7.1, 7.2, 7.3, 7.4, 7.5, 7.6, 7.7, 7.8, 7.9, 8, 8.1, 8.2, 8.3, 8.4, 8.5, 8.6, 8.7, 8.8, 8.9, 9.0 mm. In some embodiments the radius of curvature at the posterior surface of the peripheral spheric portion is larger than 8.5 mm. In some embodiments, said peripheral spheric portion is about 8.5, 8.6, 8.7, 8.8, 8.9, 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, 11.0, 11.1, 11.2, 11.3, 11.4, 11.5, 11.6, 11.7, 11.8, 11.9, 12.0, 12.1, 12.2, 12.3, 12.4, 12.5, 12.6, 12.7, 12.8, 12.9, 13.0, 13.1, 1.2, 13.3, 13.4, 13.5, 13.6, 13.7, 13.8, 13.9, 14.0, 14.1, 14.2, 14.3, 14.4, 14.5, 14.6, 14.7, 14.8, 14.9, 15.0, 15.1, 15.2, 15.3, 15.4, 15.5, 15.6, 15.7, 15.8, 15.9, 16.0, 16.1, 16.2, 16.3, 16.4, 16.5, 16.6, 16.7, 16.8, 16.9, 17.0, 17.1, 17.2, 17.3, 17.4, 17.5, 17.6, 17.7, 17.8, 17.9, 18.0, 18.1, 18.2, 18.3, 18.4, 18.5, 18.6, 18.7, 18.8, 18.9, 19.0, 19.1, 19.2, 19.3, 19.4, 19.5, 19.6, 19.7, 19.8, 19.9, 20.0, 20.1, 20.2, 20.3, 20.4, 20.5, 20.6, 20.7, 20.8, 20.9, 21.0, 21.1, 21.2, 21.3, 21.4, 21.5, 21.6, 21.7, 21.8, 21.9, 22.0 mm.

In some embodiments the peripheral spheric portion has a reverse base curve between 15.0 and 25 mm. In some embodiments the peripheral spheric portion has a reverse base curve of 15.0, 15.1, 15.2, 15.3, 15.4, 15.5, 15.6, 15.7, 15.8, 15.9, 16.0, 16.1, 16.2, 16.3, 16.4, 16.5, 16.6, 16.7, 16.8, 16.9, 17.0, 17.1, 17.2, 17.3, 17.4, 17.5, 17.6, 17.7, 17.8, 17.9, 18.0, 18.1, 18.2, 18.3, 18.4, 18.5, 18.6, 18.7, 18.8, 18.9, 19.0, 19.1, 19.2, 19.3, 19.4, 19.5, 19.6, 19.7, 19.8, 19.9, 20.0, 20.1, 20.2, 20.3, 20.4, 20.5, 20.6, 20.7, 20.8, 20.9, 21.0, 21.1, 21.2, 21.3, 21.4, 21.5, 21.6, 21.7, 21.8, 21.9, 22.0, 22.1, 22.2, 22.3, 22.4, 22.5, 22.6, 22.7, 22.8, 22.9, 23.0, 23.1, 23.2, 23.3, 23.4, 23.5, 23.6, 23.7, 23.8, 23.9, 24.0, 24.1, 24.2, 24.3, 24.4, 24.5, 24.6, 24.7, 24.8, 24.9, 25 mm.

In some embodiments the radius of curvature at the posterior surface of the central aspheric portion is less than 9 mm in its center and a base curve of less than 8 mm in its edge. In some embodiments, said central aspheric portion in its center is about 9, 8.9, 8.8, 8.7, 8.6, 8.5, 8.4, 8.3, 8.2, 8.1, 8, 7.9, 7.8, 7, 7.6, 7.5, 7.4, 7.3, 7.2, 7.1, 7, 6.9, 6.8 mm. In some embodiments, said central aspheric portion in its edge is about, 8.0, 7.9, 7.8, 7, 7.6, 7.5, 7.4, 7.3, 7.2, 7.1, 7, 6.9, 6.8, 6.7, 6.6, 6.5, 6.4, 6.3 mm. In some embodiments, said central aspheric portion is about any combination of the said central aspheric portion in its center and the said central aspheric portion in its edge.

In some embodiments the radius of curvature at the posterior surface of the peripheral aspheric portion is larger than 8.0 mm in its proximal end, and is larger than 8.5 in its distal edge. In some embodiments, said peripheral aspheric portion in its proximal end is about 8.5, 8.6, 8.7, 8.8, 8.9, 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, 11.0, 11.1, 11.2, 11.3, 11.4, 11.5, 11.6, 11.7, 11.8, 11.9, 12.0, 12.1, 12.2, 12.3, 12.4, 12.5, 12.6, 12.7, 12.8, 12.9, 13.0, 13.1, 1.2, 13.3, 13.4, 13.5, 13.6, 13.7, 13.8, 13.9, 14.0, 14.1, 14.2, 14.3, 14.4, 14.5, 14.6, 14.7, 14.8, 14.9, 15.0, 15.1, 15.2, 15.3, 15.4, 15.5, 15.6, 15.7, 15.8, 15.9, 16.0, 16.1, 16.2, 16.3, 16.4, 16.5, 16.6, 16.7, 16.8, 16.9, 17.0, 17.1, 17.2, 17.3, 17.4, 17.5, 17.6, 17.7, 17.8, 17.9, 18.0, 18.1, 18.2, 18.3, 18.4, 18.5, 18.6, 18.7, 18.8, 18.9, 19.0, 19.1, 19.2, 19.3, 19.4, 19.5, 19.6, 19.7, 19.8, 19.9, 20.0, 20.1, 20.2, 20.3, 20.4, 20.5, 20.6, 20.7, 20.8, 20.9, 21.0, 21.1, 21.2, 21.3, 21.4, 21.5, 21.6, 21.7, 21.8, 21.9, 22.0 mm.

In some embodiments, said peripheral aspheric portion in its distal end is about 8.5, 8.6, 8.7, 8.8, 8.9, 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, 11.0, 11.1, 11.2, 11.3, 11.4, 11.5, 11.6, 11.7, 11.8, 11.9, 12.0, 12.1, 12.2, 12.3, 12.4, 12.5, 12.6, 12.7, 12.8, 12.9, 13.0, 13.1, 1.2, 13.3, 13.4, 13.5, 13.6, 13.7, 13.8, 13.9, 14.0, 14.1, 14.2, 14.3, 14.4, 14.5, 14.6, 14.7, 14.8, 14.9, 15.0, 15.1, 15.2, 15.3, 15.4, 15.5, 15.6, 15.7, 15.8, 15.9, 16.0, 16.1, 16.2, 16.3, 16.4, 16.5, 16.6, 16.7, 16.8, 16.9, 17.0, 17.1, 17.2, 17.3, 17.4, 17.5, 17.6, 17.7, 17.8, 17.9, 18.0, 18.1, 18.2, 18.3, 18.4, 18.5, 18.6, 18.7, 18.8, 18.9, 19.0, 19.1, 19.2, 19.3, 19.4, 19.5, 19.6, 19.7, 19.8, 19.9, 20.0, 20.1, 20.2, 20.3, 20.4, 20.5, 20.6, 20.7, 20.8, 20.9, 21.0, 21.1, 21.2, 21.3, 21.4, 21.5, 21.6, 21.7, 21.8, 21.9, 22.0 mm.

In some embodiments, said peripheral aspheric portion is about any combination of the said peripheral aspheric portion in its proximal end and the said peripheral aspheric portion in its distal end.

In some embodiments, the soft continuous lens body has a uniform thickness throughout the optical region. In some embodiments, the soft continuous lens body has a non-uniform thickness throughout the optical region. In some embodiments, the central thickness of the soft continuous lens body at the optical region is from about 80 micrometers ("µm") to about 350 µm. In some embodiments, the soft continuous lens body further comprises an axially symmetric lens volume. In some embodiments, the soft continuous lens body further comprises a non-axially symmetric lens volume.

In some embodiments, the non-optical region starts at a distance from center of 1.5 mm to about 14 mm. In some embodiments, the optical region has a diameter of about 3 mm to about 12 mm.

In some embodiments, at least one fenestration is positioned in the optical region. In some embodiments, at least one fenestration is positioned in the non-optical region. In some embodiments, at least one fenestration is positioned in both the optical and non-optical regions. In some embodiments, at least one fenestration is positioned on the anterior surface of lens. In some embodiments, at least one fenestration is positioned on the posterior surface of the lens. In some embodiments, at least one fenestration is positioned on both the anterior and the posterior surface. In some embodiments, said lens body further comprises at least one of a channel, a fenestration, a groove, an opening, a slit, a thin portion, or any combination thereof. In some embodiments, said lens body further comprises a channel. In some embodiments, said lens body further comprises a channel further configured to allow a fluid to flow Into and out of the free volume. In some embodiments, said lens body further comprises a groove. In some embodiments, said lens body further comprises a groove further configured to reduce mechanical distortion of the continuous lens body. In some embodiments, said lens body further comprises a fenestration. In some embodiments said lens body further comprises a fenestration further configured to allow a fluid to flow into and out of the free volume. In some embodiments, the fenestration is configured to allow a fluid to flow into and out of the free volume, indirectly, by connecting through a channel. In some embodiments, at least a portion of the soft continuous lens body is configured to conform to the corneal surface of the eye forming a deformation of the continuous lens body. In some embodiments, said lens body is further configured to substantially prevent translation of the deformation to a non-conforming portion of the soft continuous lens body.

In some embodiments, the lens does not have any protrusions extending from the posterior surface.

In some embodiments, the lens has a diameter from about 8 mm to about 17 mm.

In some embodiments, the free volume between the posterior surface of the soft continuous lens body and the corneal surface has a total volume from about 0.001 microliters ("µL") to 10 µL.

In some embodiments, at least one sector of the soft continuous lens body from a center of the soft continuous lens body to a peripheral edge of the soft continuous lens body is configured to be suspended over the corneal surface to form at least a portion of the free volume when the continuous lens body is disposed over the corneal surface. In some embodiments, any of the at least one sector of the soft continuous lens body is capable of being suspended over the corneal surface to form at least a portion of the free volume when the continuous lens body is disposed over the corneal surface.

In another aspect, the present disclosure provides a method for correcting an ocular refractive error of the eye using the soft contact lenses of the present disclosure.

In another aspect, the present disclosure provides a method for forming a tear lens using the soft contact lenses of the present disclosure. In some embodiments, applying to the eye the soft contact lens of the present disclosure causes the tear lens to form with an asymmetric volume distribution. In some embodiments, the asymmetric volume distribution corrects one or more of a corneal irregularity, coma, astigmatism, or higher order aberration of the eye. In some embodiments, in the asymmetric volume distribution, the volume of a first tear lens sector is different from the volume of a second tear lens sector diametrically opposed or adjacently neighboring to the first tear lens sector. In some embodiments, the volume of the first tear lens sector being different from the volume of the second tear lens sector corrects a coma of the eye.

The ability of the soft contact lenses described herein to be able to mask astigmatism and coma can provide an advantage over many commercially available astigmatism-masking toric contact lenses. While such toric lenses can provide different refractive powers between meridians, they may not provide different refractive power within the same meridians. By contrast, the soft contact lenses provided herein may have multiple sectors, the volume of the tear lens under each sector may be different, and the combination of each sector and tear lens portion directly posterior to its respective sector may provide different refractive power. As further discussed herein, the soft contact lenses described herein may mask astigmatism and coma independently of rotational orientation, while such toric lens require wear in a dependent particular rotational orientation to mask astigmatism.

In another aspect, the present disclosure provides a method for correcting an ocular refractive error of the eye including the step of providing optical correction to an eye of a subject with an optical region of a soft contact lens and a free volume between a posterior surface of the lens and a corneal surface when positioned on the eye. In some embodiments, the at least one discontinuity of the soft contact lens allows tear fluid to flow into the free volume to form a tear lens over an ocular abnormality to correct an ocular refractive error of the eye.

In another aspect, the present disclosure provides a method for forming a tear lens including the step of applying to an eye a soft contact lens having a continuous body so as to form a free volume between a posterior surface of the continuous body and a corneal surface of the eye. In some embodiments, the at least one discontinuity of the soft contact lens allows tear fluid to flow into the free volume to form a tear lens over an ocular abnormality to correct an ocular refractive error of the eye.

In some embodiments, the soft contact lens is applied to the eye in any orientation such that the lens corrects the ocular refractive error of the eye irrespective of the orientation of the lens to a meridian of eye.

In some embodiments, the soft contact lens has a rigidity range from about 1.25E+04 mPa*μm3 to about 5.00E+08 mPa*μm3.

In some embodiments, the ocular refractive error originates from one or more of a corneal irregularity, coma, astigmatism, or high order aberration of the eye.

In some embodiments, the ocular refractive error is an astigmatism of the eye.

In some embodiments, one or both of an anterior surface of the lens or a posterior surface of the lens is axially symmetric.

In some embodiments, an optical region of the lens has a uniform thickness.

In some embodiments, an optical region of the lens has a non-uniform thickness.

In some embodiments, the soft contact lens is made of a single material.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
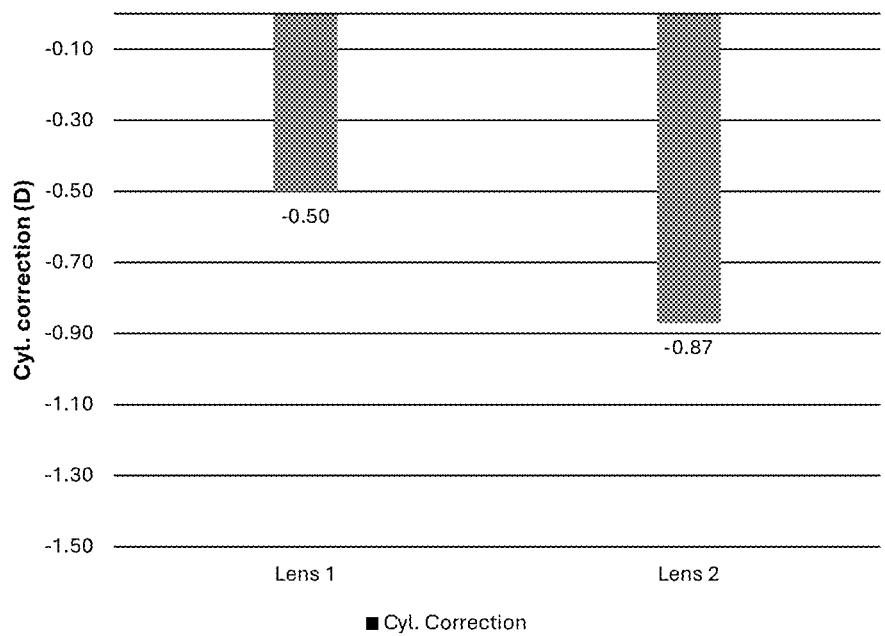
FIG. 1 shows the cylindrical correction of the two lenses compared in Example 5 (cylindrical masking, paired N=6).

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments, however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Unless otherwise defined, all technical terms used herein have the same meaning as commonly understood by one of ordinary skill in the art to which this disclosure belongs. As used herein, the singular forms "a," "an," and "the" include plural references unless the context clearly indicates otherwise. Any reference to "or" herein is intended to encompass "and/or" unless otherwise stated. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present disclosure.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," "less than or equal to," or "at most" precedes the first numerical value in a series of two or more numerical values, the term "no more than," "less than," "less than or equal to," or "at most" applies to each of the numerical values in that series of numerical values. For example, less than or equal to 3, 2, or 1 is equivalent to less than or equal to 3, less than or equal to 2, or less than or equal to 1.

Where values are described as ranges, it will be understood that such disclosure includes the disclosure of all possible sub-ranges within such ranges, as well as specific numerical values that fall within such ranges irrespective of whether a specific numerical value or specific sub-range is expressly stated.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Many of the features of the present disclosure are described in relation to the anatomy of the eye of a subject. The eye includes several tissues that allow a subject to see. The subject may be an animal. The subject may be a human, such as a patient. The cornea of the eye is an anterior region of the eye that is clear in healthy eyes and refracts light to form an image on the retina. The retina is a posterior region of the eye that senses light from the image formed thereon and transmits signals from the image to the brain. The cornea includes an outer layer of tissue, the epithelium, which protects the underlying tissues of the cornea, such as Bowma's membrane, the stroma and nerve fibers that extend into the stroma and Bowman's membrane. A healthy eye includes a tear film disposed over the epithelium. The tear film can smooth small irregularities of the epithelium to provide an optically-smooth surface. The tear film is shaped substantially by the shape of the underlying epithelium, stroma, and Bowma's membrane, if present. The tear film comprises a liquid that is mostly water but also includes additional components, such as mucoids and lipids. The many nerve fibers of the cornea provide sensation to promote blinking that can cover the cornea with the tear film. The never fibers also sense pain so that a subject will normally avoid trauma to the cornea and also avoid direct contact of an object to the cornea.

The embodiments described herein can be used to treat eye in many ways using one or more coverings. The coverings may comprise contact lenses. The coverings may be soft contact lens. The coverings and/or contact lenses may be capable of masking astigmatism and may be used to treat the same. Such contact lenses may comprise one or more astigmatism-masking contact lenses. The contact lenses may come in various versions. The coverings may comprise one or more soft lenses which may fit normally. In some cases, the contact lenses may be used for long-term vision correction with extended wear. The contact lenses may be used to treat astigmatism. In other examples, the coverings and/or contact lenses may be used in combination with or after surgery for improved results and/or recovery.

Unlike toric soft contact lenses, that require stabilization to position the correcting cylinder at the appropriate axis, the lenses of the present disclosure generally do not require stabilization. Accordingly, the lenses of the present disclosure may not have a mechanism for stabilizing the rotation of the lens to a particular cylinder of the eye. Further, the lenses of the present disclosure may not have orientation features or indicia (e.g., off-color markings on or within the contact lens body, one or more truncations of the peripheral edge of the contact lens body, an asymmetrical shape of the contact lens body, and the like) for stabilizing the rotation of the lens to a particular cylinder of the eye. For example, the lenses of the present disclosure may not include a prism-ballast (thickness differences across the lens profile that determine the lens rotation orientation) or periballast (i.e., bal-flange). Further the lenses of the present disclosure may not have non-prism ballast features such as a thin-zone, double-slab-off, or dynamic stabilization.

In some embodiments, the soft contact lens may correct or mask an ocular refractive error of the eye. The ocular refractive error may include one or more of a corneal irregularity, coma, astigmatism, or higher order aberration of the eye.

In some embodiments, the soft contact lenses may correct (i.e., mask) an ocular refractive error or aberration of the eye by at least about 20%, 30%, 40%, 50%, 60%, 65%, 70%, 75%, 80%, 85%, 90%, 95%, 99%, or more. In some embodiments, the optical aberration of the eye is a first order aberration or spherical aberration. In some embodiments, the optical aberration of the eye is a second order aberration or cylindrical aberration. In some embodiments, the optical aberration is a third order aberration or coma.

In some embodiments, the soft contact lenses may correct (i.e., mask) an astigmatism by at least about 20%, 30%, 40%, 50%, 60%, 65%, 70%, 75%, 80%, 85%, 90%, 95%, 99%, or more. For example, a soft contact lens may mask astigmatism up to 1 D. In some examples, the soft contact lens may also mask an astigmatism up to 2 D. In other examples, the soft contact lens may also mask an astigmatism up to 3 D. The soft contact lenses may mask astigmatism by an amount that is within a range defined by any two of the preceding values.

In some cases, correcting an ocular refractive error or aberration of the eye comprises masking a 1 millimeter (mm), 2 mm, 3 mm, 4 mm, 5 mm, 6 mm, 7 mm, 8 mm, 9 mm, 10 mm, 11 mm, 12 mm, or larger diameter of the corneal surface. In some examples, masking an ocular refractive error or aberration of the eye comprises masking about a 12 mm, 11 mm, 10 mm, 9 mm, 8 mm, 7 mm, 6 mm, 5 mm, 4 mm, 3 mm, 2 mm, 1 mm, or smaller diameter of the corneal surface. The ocular refractive error or aberration of the eye may have an area within a range defined by any two of the preceding values. For example, the ocular refractive error or aberration of the eye may have an area between about 9 mm and about 8 mm of the central diameter of the cornea.

In some cases, correcting an astigmatism comprises masking a 1 millimeter (mm), 2 mm, 3 mm, 4 mm, 5 mm, 6 mm, 7 mm, 8 mm, 9 mm, 10 mm, 11 mm, 12 mm, or larger diameter of the corneal surface. In some examples, masking an astigmatism comprises masking about a 12 mm, 11 mm, 10 mm, 9 mm, 8 mm, 7 mm, 6 mm, 5 mm, 4 mm, 3 mm, 2 mm, 1 mm, or smaller diameter of the corneal surface. The astigmatic area may be within a range defined by any two of the preceding values. For example, the astigmatic area may be between about 9 mm and about 8 mm of the central diameter of the cornea.

In some cases, the soft contact lenses may reduce stock keeping unit (SKU) requirements by at least about 30%, 40%, 50%, 60%, 70%, 80%, 90%, 95%, 99%, or more compared to soft toric contact lenses or other conventional contact lenses. In some cases, the soft contact lenses may reduce SKU requirements by at most about 99%, 95%, 90%, 80%, 70%, 60%, 50%, or less compared to soft toric contact lenses or other conventional contact lenses. For example, a soft contact lens provided herein may reduce SKUs requirements by up to about 95%. The contact lenses may reduce SKU requirements by an amount that is within a range defined by any two of the preceding values.

In some embodiments, the soft contact lens may also reduce the required fitting time or chair time at the eye care professional or the number of visits until the final lens fit is determined.

Example 1: Comparison between BC of 8.06 and BC of 7.86 J1 lenses with central BC of 7.86 mm were compared to J1 lenses with central BC of 8.06 mm (with 300 un central thickness, transition to peripheral BC at R=5.2 mm, Peripheral BC=9.32).

Comparison outcomes were Comfort, function, and visual acuity (VA) Lenses with central curve of 7.86 mm were found to have better correction and better comfort (with 300 un central thickness, peripheral.

TABLE 1

| Lens Central curve [mm] | N | BL Cyl | Correction (D) | Correction Ratio | Comfort (1-10) | Mean VA (logMAR) |
| --- | --- | --- | --- | --- | --- | --- |
| 8.06 | 6 | −1.42 | −0.46 | 0.31 | 6.78 | −0.07 |
| 7.86 | 25 | −1.38 | −0.76 | 0.55 | 8.24 | −0.08 |

Example 2: An aspheric lens with a center aspheric design (central BC of 9.05→8.0, central thickness=300 u and 250 u) and with aspheric periphery relatively steep (BC of 8.1-8.5 mm), made of Silicone-hydrogel. The lenses were tested by 10 subjects for 250 u and N=8 for 300 u, average cylinder correction for both groups was less that 0.25 Diopters and average comfort level was 7.8 (out of 1-10 scale)—so the geometry found to be non-functional and uncomfortable.

Example 3: Aspheric lens with aspheric periphery 8.1-8.5 (relatively steep) and center of aspheric flat to steep, 8.55→7.35 (average 7.85, similar to cornea curvature)—did not correct cylinder.

Example 4: Hydrogel, feature-less lens with flat periphery—functions and proves flat periphery enable access to fluid. A lens made of hydrogel, with central thickness of 200 u, spheric central curve of 8.6 mm, with periphery reverse base curve of 19.8 mm was tested in 5 subjects and demonstrated mean cylinder correction of 0.62 Diopters and comfort of 9.7 (on a scale of 1-10)—flat periphery enable access to fluid.

Figure 2:
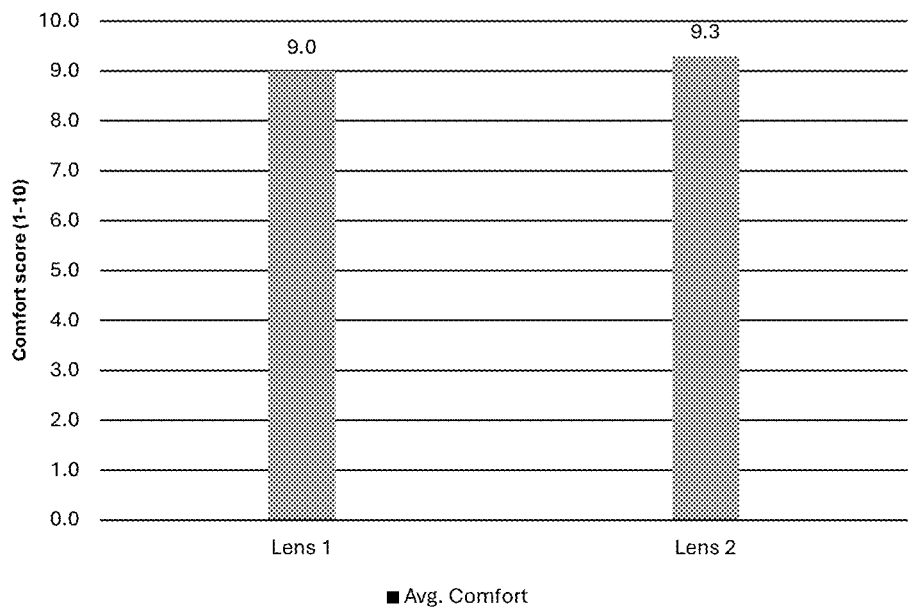
FIG. 2 shows the comfort score of the two lenses compared in Example 5 (comfort, paired N=6).

Example 5: two designs were compared among 6 subjects (FIGS. 1 and 2): 1. An aspheric lens with a aspheric center design (central curve of 9.05→8.0 mm, central thickness=300 u) and with aspheric relatively steep periphery of 8.1→8.5 mm. 2. An aspheric lens with a aspheric center design (central curve of 9.05→8.0 mm, central thickness=300 u) and with aspheric flatter periphery of 8.8→9.2 mm. Lens 2 worked well, masked astigmatism better, and was more comfortable. The average cylinder correction was −0.87 Diopters, comfort score was 9.3 (on a scale of 1-10)—flat periphery 8.8→9.2 mm enable access to fluid, function well and comfortable.

circumferential annular groove (to evaluate the effect of radial vs circumferential and to serve as a control for the circumferential with radiused transition) and 3 lenses with

TABLE 2

Summery of Experiments 3-5

| | | Contact lens | | Function | | |
|---|---|---|---|---|---|---|
| | | Center | Periphery | Correction | Comfort | Conclusion |
| Experiment 3 | Design BC (mm) in comparison to standard CL | Aspheric 8.55-7.35 flat to steep | Aspheric 8.1-8.5 steep | not functioning | 7.8 | flat to steep center at center and steep periphery is non-functional and uncomfortable |
| Experiment 4 | Design BC (mm) in comparison to standard CL | spheric 8.6 standard | spheric 19.8 very flat | −0.62 D | 9.7 | lens is function and comfortable, due to flat periphery that enable access to fluid and |
| Experiment 5 | Design BC (mm) in comparison to standard CL | Aspheric 9.05->8.0 flat to steep | Aspheric 8.8->9.2 steep to flat | −0.87 D | 9.3 | lens is function and comfortable (better than the same lens with steeper periphery), due to flat periphery that enable access to fluid and |

Figure 3B:
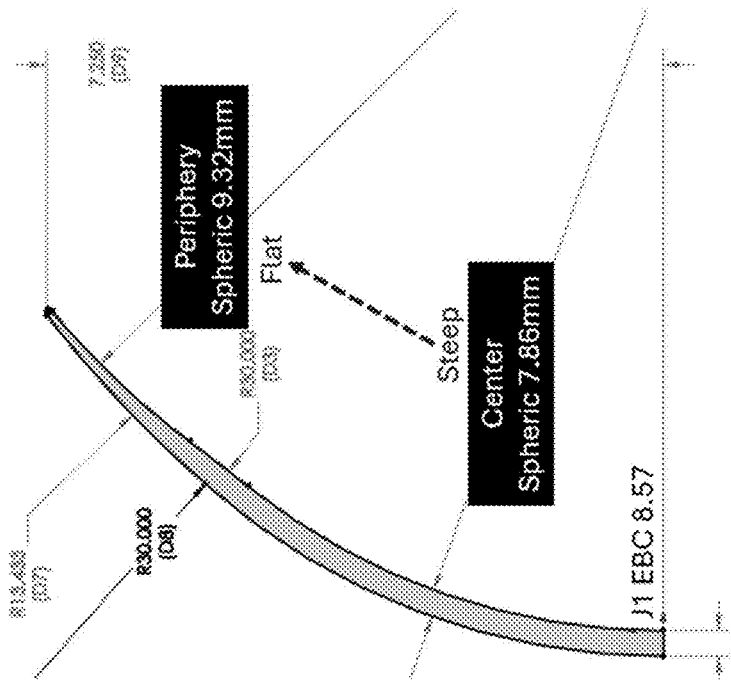
FIGS. 3A and 3B show the aspheric (3A) vs spheric (3B) lenses design of the invention.
Figure 3A:
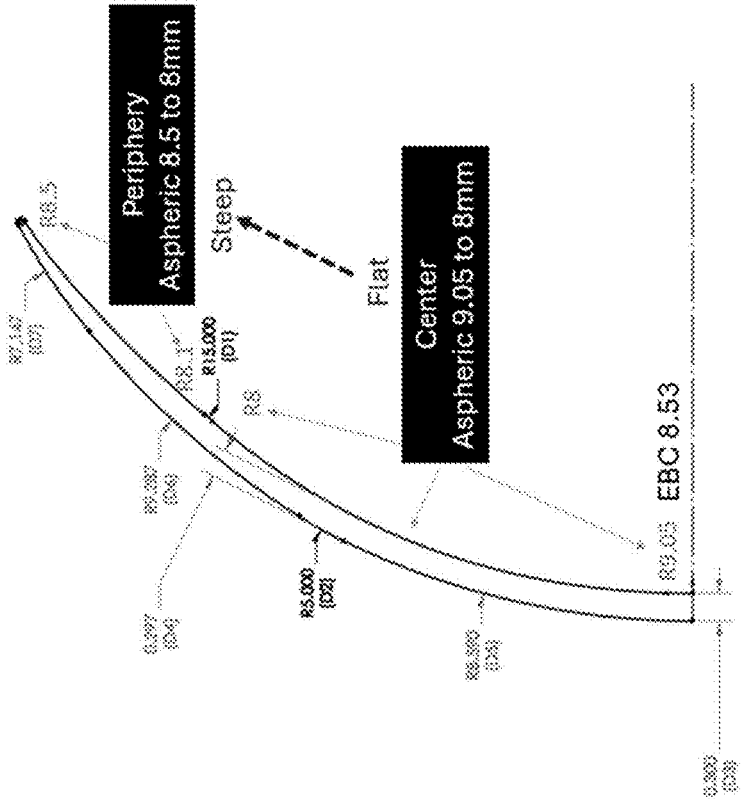
Figure 4A:
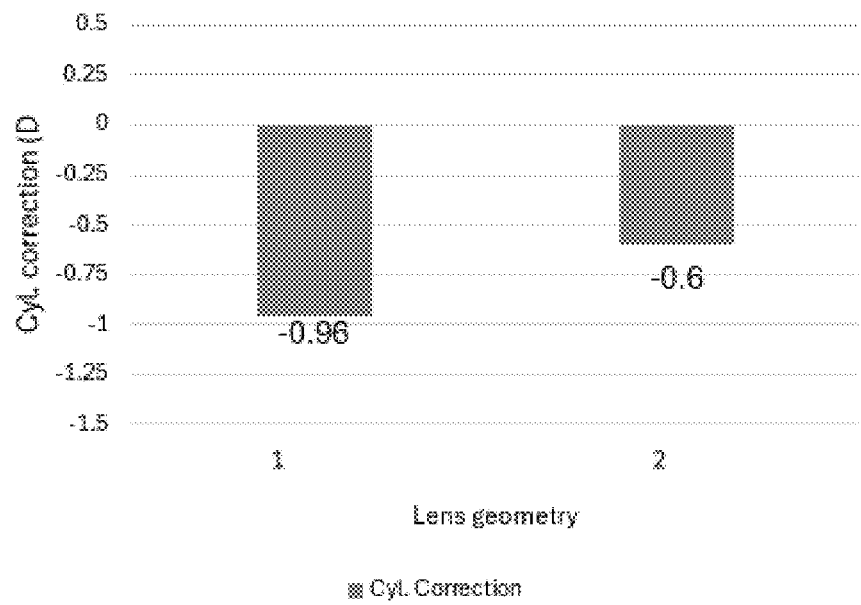
FIGS. 4A and 4B show the aspheric (4A) vs spheric (4B) lenses of the invention performance and comfort.
Figure 4B:
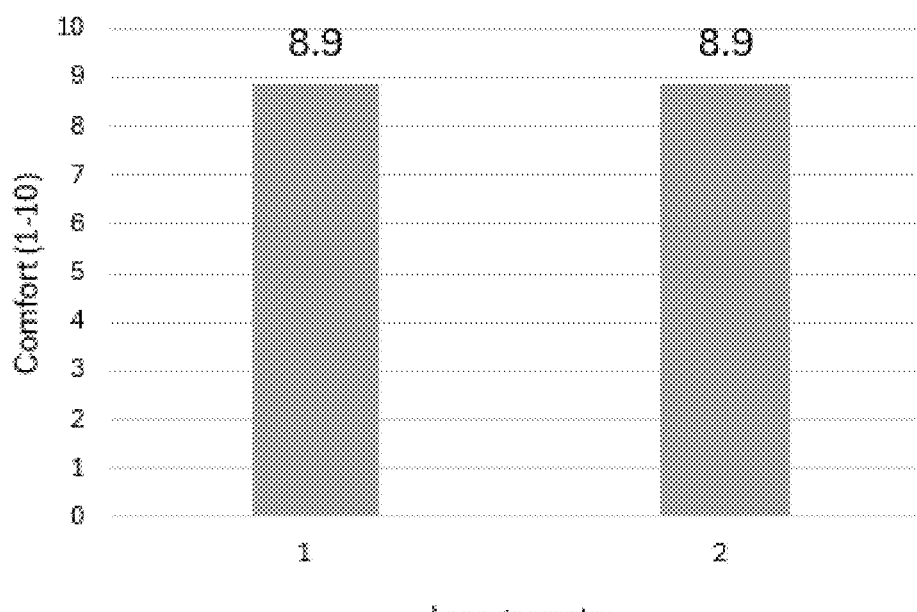

Example 6: The effect of Sphericity on performance. two designs, with the same material, same manufacturing, same features and the same EBC (Equivalent Base Sphere were compared among 5 subjects (designs are shown in FIGS. 3A and 3B): lens 1. An aspheric lens with a aspheric center design (central curve of 9.05→8.0 mm, central thickness=300 u) and with aspheric periphery of 8.5→8.0 mm. lens 2. A aspheric lens with a spherical center design (central curve of 8.05 mm, central thickness=300 u) and with spherical periphery of 9.32 mm. The average cylinder correction was −0.6 Diopters for the aspherical design and −0.96 for the spherical design, comfort score was 8.9 for both designs (on a scale of 1-10)—spheric design is function better than aspheric, while comfort is the same (FIGS. 4A and 4B)

Example 7: The effect of circumferential fillet at the transition at 5.2 mm radius (transition to peripheral curve). 74 subjects who wear a lens to correct astigmatism with minimal fillet on the transition (0.2 mm base curve to the opposite direction of the lens curve) were compared to 32 subjects who wear a lens with the same design, but with a smoother transition (30 mm base curve to opposite direction of the lens curve). The average comfort of the 0.2 fillet was 8 (on scale of 1-10 comfort) while average comfort of the 30.0 mm fillet was 9.2. On a paired retrospective comparison (where only 22 subject who wore both 0.2 mm and 30 mm fillet were participated), The average comfort of the 0.2 fillet was 8.2 (on scale of 1-10 comfort) while average comfort of the 30.0 mm fillet was 9.1.

Figure 5:
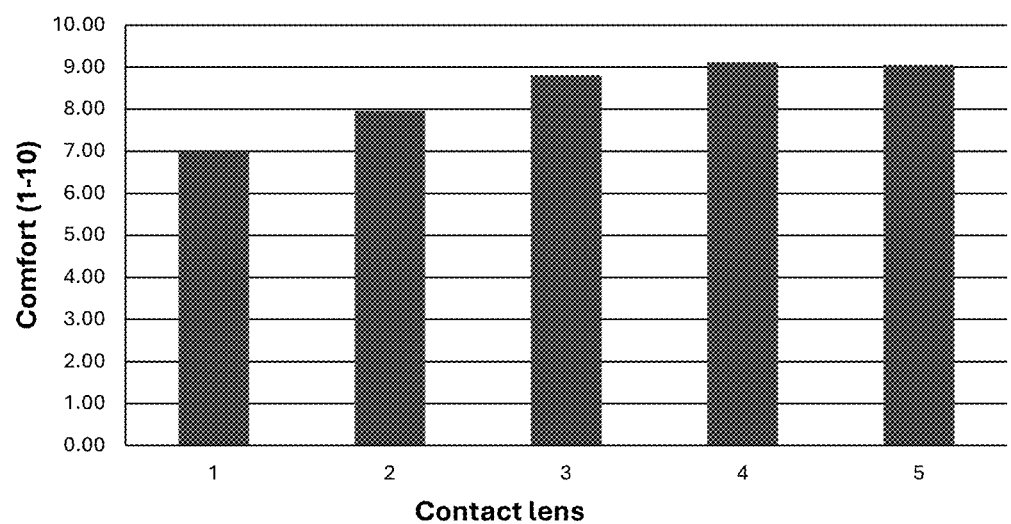
FIG. 5 shows the comfort for each lens described in Table 2 of Example 8.
Figure 6:
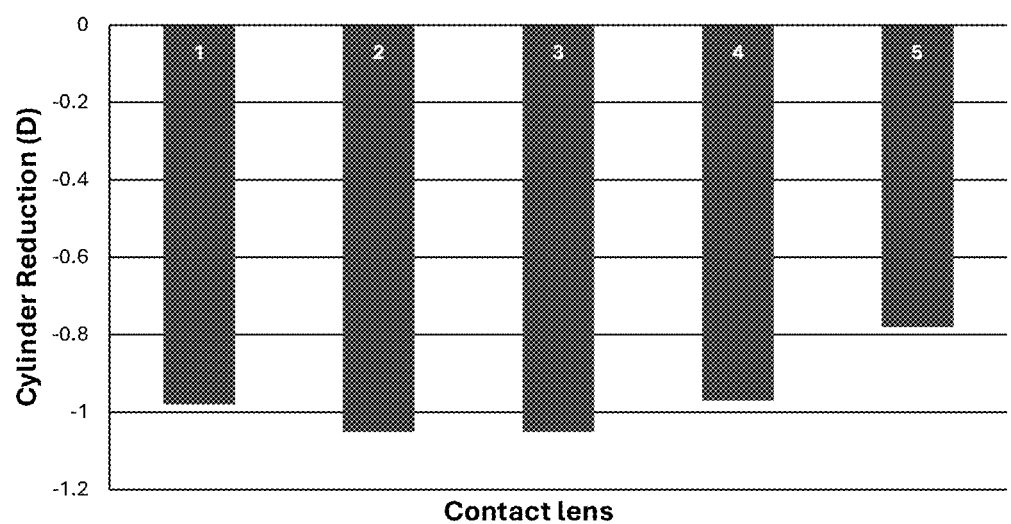
FIG. 6 shows the cylinder reduction for each lens described in Table 2 of Example 8.

Example 8: 5 subjects were examined to evaluate the comfort and efficiency of Astigmatism correction contact lenses with different designs. The lenses that were examined were: a control lens with radial angular grooves (to evaluate the effect of radial vs circumferential), a control lens with different levels of radiused transitions; narrow, medium and wide. The results are summarized in Table 2 below. FIGS. 5 and 6 show the comfort (FIG. 5) and cylinder reduction (FIG. 6) for each lens described in Table 2 below.

TABLE 2

Lenses of Example 8

| Lens Design | Lens | Transition | Mean reduction (Cyl.) | Mean Comfort [1-10] | N |
|---|---|---|---|---|---|
| 1. Control - 8 radial grooves, 8 fenestrations, 300 mic,-BC 7.86 | Control - radial | angular | −0.98 D | 7.00 | 5 |
| 2. Control - one circumferential groove 360, 8 fenestrations @6.6 mm, 300 mic, angular transition to groove | Control - circumferential 360 | angular | −1.05 D | 7.96 | 5 |
| 3. one circumferential groove 360, 8 fenestrations @6.6 mm, 300 mic, radiused angle of 2.14mm (transition groove to lens body) | Circumferential-narrow curved | Radiused - 2.144 mm | −1.05 D | 8.81 | 5 |
| 4. one circumferential groove 360, 8 fenestrations @6.6 mm, 300 mic, radiused angle of 3.53 mm (transition groove to lens body) | Circumferential-Medium curved | Radiused - 3.53 mm | −0.97 D | 9.12 | 5 |
| 5. one circumferential groove 360, 8 fenestrations @6.6 mm, 300 mic, radiused | Circumferential-wide curved | Radiused - 10 mm | −0.78 D | 9.05 | 5 |

TABLE 2-continued

Lenses of Example 8

| Lens Design | Lens | Transition | Mean reduction (Cyl.) | Mean Comfort [1-10] | N |
|---|---|---|---|---|---|
| angle of 2.14mm (transition groove to lens body) | | | | | |

Conclusions: Circumferential contact lenses with radiused transition are better tolerated. Radiused transition of >3.5 mm doesn't seem to add more comfort, due to effect saturation There is an optimal spot between comfort and function around 3.5 mm.

Example 9: Instability experiment. 19 eyes of 19 subjects, with astigmatism, ranged −0.75 D to −1.75 D were examined for the effect of EBC (the average curvature of the lens) on cylinder correction performance, comfort, and stability (stability is defined when vision not improved or worsen immediately post blinking) contact lenses, made of Silicone Hydrogel were manufactured. All the manufactured lenses had a central thickness of 300 u and diameter of 14.5 mm. The lenses had a different curvature, EBCs base curves were ranged 7.98-8.85 mm. EBC was modified, either by moving the transition point between central curvature and peripheral curvature (central curvature is steeper than the peripheral).

Figure 7:
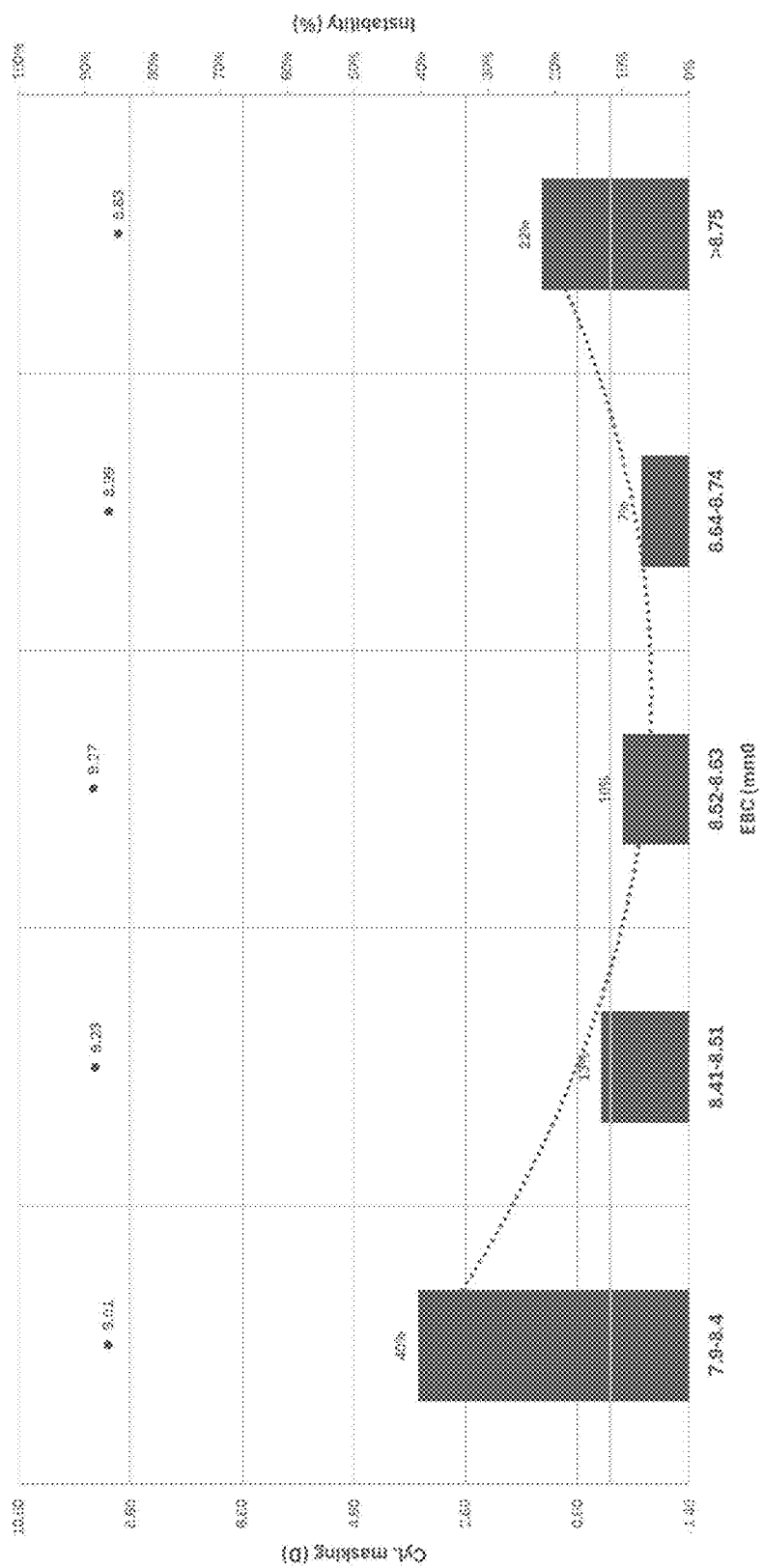
FIG. 7 shows the effect of the EBC on the comfort and instability of the lens of the invention.

Instability of more than 20% was defined as instable. Cylinder correction ranged −0.75 D to −0.92 D with no significant difference between the EBCs, Comfort was above 8 (1-10) in all of the EBCs. FIG. 7 shows the effect of the EBC on the comfort and instability of the lens of the invention.

Conclusions: Results suggest that when EBC moved from a geometrical match between the lens and cornea, either to "flat mismatch" or "steep mismatch", mismatch volumes are formed and susceptive for blinking the best EBC range that was found was 8.41 to 8.7 mm.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A soft contact lens for correcting an ocular refractive error of an eye, comprising:
    a soft continuous lens body configured to cover a corneal surface of the eye having an anterior and posterior surface; and
    wherein said contact lens has a central thickness of between about 80 microns to about 350 microns; and
    wherein the soft contact lens is axisymmetric;
    wherein said soft continuous lens body having at least a central aspheric portion and a peripheral aspheric portion;
    wherein said central aspheric portion has a base curve of less than 9 mm in its center and a base curve of less than 8 mm in its edge; and
    wherein said peripheral aspheric portion has a base curve in its proximal end that is larger than 8 mm and a base curve in its distal end that is larger than 8.5 mm;
    wherein at least a portion of the posterior surface of the soft lens body is configured to be suspended above a corneal surface of the eye when placed thereon forming a free volume between the posterior surface of the soft lens body and the corneal surface; and wherein at least a portion of the free volume is configured to be filled with tear fluid to form a tear lens over the corneal surface thereby correcting an ocular refractive error of the eye.

2. The soft contact lens according to claim 1, wherein said refractive error of the eye is selected from corneal irregularity, coma, astigmatism, higher order aberration of the eye and any combinations thereof.

3. The soft contact lens according to claim 1, wherein said soft lens body comprises at least one discrete discontinuity selected from a channel, a fenestration, a groove, an opening, a slit, a thin portion, or any combination thereof.

4. The soft contact lens according to claim 1, having a young modulus that is <4 Mpa.

5. The soft contact lens according to claim 1, wherein said refractive error is astigmatism.

6. The soft contact lens according to claim 1, wherein refractive error is optical aberration of the eye.

7. The soft contact lens according to claim 1, wherein said soft lens body having an anterior surface, a posterior surface, and at least one fenestration traversing between the anterior surface and the posterior surface; wherein said at least one fenestration is positioned adjacent to a tear meniscus of the eye.

8. The soft contact lens according to claim 7, wherein said at least one fenestration is configured to be positioned adjacent a tear meniscus of the eye to promote flow of tear fluid therefrom to the free volume from adjacent the anterior surface of the lens body to the posterior surface of the lens body and to the free volume.

9. The soft contact lens according to claim 8, wherein said tear meniscus is one or more of an upper tear meniscus or a lower tear meniscus of the eye.

10. The soft contact lens according to claim 8, wherein the at least one fenestration is configured to be positioned adjacent to the tear meniscus to promote flow of tear fluid to the free volume irrespective of an orientation of the lens body to the tear meniscus, when the lens body is applied over the corneal surface with the eyelid of the eye open.

11. The soft contact lens according to claim 8, wherein said at least one fenestration is configured to be positioned adjacent to the tear meniscus to promote flow of tear fluid to the free volume.

12. The soft contact lens according to claim 8, wherein the at least one fenestration is configured to be positioned adjacent to the tear meniscus at a distance from about 0.0 mm to about 4 mm.

13. The soft contact lens according to claim 7, wherein said at least one fenestration is positioned from about 3 mm to about 9 mm from a center of the lens body.

14. The soft contact lens according to claim 7, comprising a plurality of fenestrations adjacent to a tear meniscus of the eye.

15. The soft contact lens according to claim 14, wherein the plurality of fenestrations is distributed circumferentially.

16. The soft contact lens according to claim 14, wherein the plurality of fenestrations is distributed radially.

17. The soft contact lens according to claim 14, wherein the plurality of fenestrations is distributed along at least one meridian of the soft lens body.

18. The soft contact lens according to claim 14, wherein the plurality of fenestrations is distributed along two meridians of the soft lens body, where the angle between them is between 45-135 degrees.

19. The soft contact lens according to claim 7, wherein said at least one fenestration has a length of about 40 μm to about 600 μm.

20. The soft contact lens according to claim 7, wherein said at least one fenestration has a cross-sectional area from about 0.0001 mm² to about 1 mm².

21. The soft contact lens according to claim 7, wherein said at least one fenestration has a cross-sectional area that is circular in shape.

22. The soft contact lens according to claim 7, wherein the at least one fenestration is positioned from about 3 mm to about 8 mm from a center of the lens body.

23. The soft contact lens according to claim 1, wherein said central portion extends from the center of the lens to a radius of about 3 mm to 7.5 mm.

24. The soft contact lens according to claim 1, wherein said peripheral portion extends starting at a radius from the center of the lens of about 3 mm to 8 mm.

25. A soft contact lens for correcting an ocular refractive error of an eye, comprising:
a soft continuous lens body configured to cover a corneal surface of the eye having an anterior and posterior surface; and
wherein said contact lens has a central thickness of between about 80 microns to about 350 microns; and
wherein the soft contact lens is axisymmetric;
wherein said soft lens body having at least a central spheric portion and a peripheral aspheric portion;
wherein said central spheric portion a base curve being less than 9 mm; and
wherein said peripheral aspheric portion has a base curve being larger than 8 mm in its proximal end and a base curve that is larger than 8.5 mm in its distal end;
wherein at least a portion of the posterior surface of the soft lens body is configured to be suspended above a corneal surface of the eye when placed thereon forming a free volume between the posterior surface of the soft lens body and the corneal surface; and wherein at least a portion of the free volume is configured to be filled with tear fluid to form a tear lens over the corneal surface thereby correcting an ocular refractive error of the eye.

26. The soft contact lens according to claim 25, wherein said refractive error of the eye is selected from corneal irregularity, coma, astigmatism, higher order aberration of the eye and any combinations thereof.

27. The soft contact lens according to claim 25, wherein said soft lens body comprises at least one discrete discontinuity selected from a channel, a fenestration, a groove, an opening, a slit, a thin portion, or any combination thereof.

28. The soft contact lens according to claim 25, having a young modulus that is <4 Mpa.

29. The soft contact lens according to claim 25, wherein said refractive error is astigmatism.

30. The soft contact lens according to claim 25, wherein refractive error is optical aberration of the eye.

31. The soft contact lens according to claim 25, wherein said soft lens body having an anterior surface, a posterior surface, and at least one fenestration traversing between the anterior surface and the posterior surface; wherein said at least one fenestration is positioned adjacent to a tear meniscus of the eye.

32. The soft contact lens according to claim 31, wherein said at least one fenestration is configured to be positioned adjacent a tear meniscus of the eye to promote flow of tear fluid therefrom to the free volume from adjacent the anterior surface of the lens body to the posterior surface of the lens body and to the free volume.

33. The soft contact lens according to claim 32, wherein said tear meniscus is one or more of an upper tear meniscus or a lower tear meniscus of the eye.

34. The soft contact lens according to claim 32, wherein the at least one fenestration is configured to be positioned adjacent to the tear meniscus to promote flow of tear fluid to the free volume irrespective of an orientation of the lens body to the tear meniscus, when the lens body is applied over the corneal surface with the eyelid of the eye open.

35. The soft contact lens according to claim 31, wherein said at least one fenestration is configured to be positioned adjacent to the tear meniscus to promote flow of tear fluid to the free volume.

36. The soft contact lens according to claim 31, wherein the at least one fenestration is configured to be positioned adjacent to the tear meniscus at a distance from about 0.0 mm to about 4 mm.

37. The soft contact lens according to claim 31, wherein said at least one fenestration is positioned from about 3 mm to about 9 mm from a center of the lens body.

38. The soft contact lens according to claim 31, comprising a plurality of fenestrations adjacent to a tear meniscus of the eye.

39. The soft contact lens according to claim 38, wherein the plurality of fenestrations is distributed circumferentially.

40. The soft contact lens according to claim 38, wherein the plurality of fenestrations is distributed radially.

41. The soft contact lens according to claim 38, wherein the plurality of fenestrations is distributed along at least one meridian of the soft lens body.

42. The soft contact lens according to claim 38, wherein the plurality of fenestrations is distributed along two meridians of the soft lens body, where the angle between them is between 45-135 degrees.

43. The soft contact lens according to claim 31, wherein said at least one fenestration has a length of about 40 μm to about 600 μm.

44. The soft contact lens according to claim 31, wherein said at least one fenestration has a cross-sectional area from about 0.0001 mm² to about 1 mm².

45. The soft contact lens according to claim 31, wherein said at least one fenestration has a cross-sectional area that is circular in shape.

46. The soft contact lens according to claim 31, wherein the at least one fenestration is positioned from about 3 mm to about 8 mm from a center of the lens body.

47. The soft contact lens according to claim 25, wherein said central portion extends from the center of the lens to a radius of about 3 mm to 7.5 mm.

48. The soft contact lens according to claim 25, wherein said peripheral portion extends starting at a radius from the center of the lens of about 3 mm to 8 mm.

49. A soft contact lens for correcting an ocular refractive error of an eye, comprising:
a soft continuous lens body configured to cover a corneal surface of the eye having an anterior and posterior surface; and
wherein said contact lens has a central thickness of between about 80 microns to about 350 microns; and
wherein the soft contact lens is axisymmetric;
wherein said soft lens body having at least a central spheric portion and a peripheral spheric portion;
wherein said central spheric portion a base curve being less than 9 mm; and wherein said peripheral spheric portion has a base curve that is larger than 9 mm;

wherein at least a portion of the posterior surface of the soft lens body is configured to be suspended above a corneal surface of the eye when placed thereon forming a free volume between the posterior surface of the soft lens body and the corneal surface; and wherein at least a portion of the free volume is configured to be filled with tear fluid to form a tear lens over the corneal surface thereby correcting an ocular refractive error of the eye.

50. The soft contact lens according to claim 49, wherein said refractive error of the eye is selected from corneal irregularity, coma, astigmatism, higher order aberration of the eye and any combinations thereof.

51. The soft contact lens according to claim 49, wherein said soft lens body comprises at least one discrete discontinuity selected from a channel, a fenestration, a groove, an opening, a slit, a thin portion, or any combination thereof.

52. The soft contact lens according to claim 49, having a young modulus that is <4 Mpa.

53. The soft contact lens according to claim 49, wherein said refractive error is astigmatism.

54. The soft contact lens according to claim 49, wherein refractive error is optical aberration of the eye.

55. The soft contact lens according to claim 49, wherein said soft lens body having an anterior surface, a posterior surface, and at least one fenestration traversing between the anterior surface and the posterior surface; wherein said at least one fenestration is positioned adjacent to a tear meniscus of the eye.

56. The soft contact lens according to claim 15, wherein said at least one fenestration is configured to be positioned adjacent a tear meniscus of the eye to promote flow of tear fluid therefrom to the free volume from adjacent the anterior surface of the lens body to the posterior surface of the lens body and to the free volume.

57. The soft contact lens according to claim 56, wherein said tear meniscus is one or more of an upper tear meniscus or a lower tear meniscus of the eye.

58. The soft contact lens according to claim 56, wherein the at least one fenestration is configured to be positioned adjacent to the tear meniscus to promote flow of tear fluid to the free volume irrespective of an orientation of the lens body to the tear meniscus, when the lens body is applied over the corneal surface with the eyelid of the eye open.

59. The soft contact lens according to claim 55, wherein said at least one fenestration is configured to be positioned adjacent to the tear meniscus to promote flow of tear fluid to the free volume.

60. The soft contact lens according to claim 55, wherein the at least one fenestration is configured to be positioned adjacent to the tear meniscus at a distance from about 0.0 mm to about 4 mm.

61. The soft contact lens according to claim 55, wherein said at least one fenestration is positioned from about 3 mm to about 9 mm from a center of the lens body.

62. The soft contact lens according to claim 55, comprising a plurality of fenestrations adjacent to a tear meniscus of the eye.

63. The soft contact lens according to claim 62, wherein the plurality of fenestrations is distributed circumferentially.

64. The soft contact lens according to claim 62, wherein the plurality of fenestrations is distributed radially.

65. The soft contact lens according to claim 62, wherein the plurality of fenestrations is distributed along at least one meridian of the soft lens body.

66. The soft contact lens according to claim 62, wherein the plurality of fenestrations is distributed along two meridians of the soft lens body, where the angle between them is between 45-135 degrees.

67. The soft contact lens according to claim 55, wherein said at least one fenestration has a length of about 40 μm to about 600 μm.

68. The soft contact lens according to claim 55, wherein said at least one fenestration has a cross-sectional area from about 0.0001 $mm^2$ to about 1 $mm^2$.

69. The soft contact lens according to claim 55, wherein said at least one fenestration has a cross-sectional area that is circular in shape.

70. The soft contact lens according to claim 55, wherein the at least one fenestration is positioned from about 3 mm to about 8 mm from a center of the lens body.

71. The soft contact lens according to claim 49, wherein said central portion extends from the center of the lens to a radius of about 3 mm to 7.5 mm.

72. The soft contact lens according to claim 49, wherein said peripheral portion extends starting at a radius from the center of the lens of about 3 mm to 8 mm.

73. A soft contact lens for correcting an ocular refractive error of an eye, comprising:

a soft continuous lens body configured to cover a corneal surface of the eye having an anterior and posterior surface; and wherein said contact lens has a central thickness of between about 80 microns to about 350 microns; and wherein the soft contact lens is axisymmetric;

wherein said soft lens body having at least a central aspheric portion and a peripheral spheric portion;

wherein said central aspheric portion has a base curve of less than 9 mm in its center and a base curve of less than 8 mm in its edge; and wherein said peripheral spheric portion has a base curve that is larger than 9 mm;

wherein at least a portion of the posterior surface of the soft lens body is configured to be suspended above a corneal surface of the eye when placed thereon forming a free volume between the posterior surface of the soft lens body and the corneal surface; and wherein at least a portion of the free volume is configured to be filled with tear fluid to form a tear lens over the corneal surface thereby correcting an ocular refractive error of the eye.

74. The soft contact lens according to claim 73, wherein said refractive error of the eye is selected from corneal irregularity, coma, astigmatism, higher order aberration of the eye and any combinations thereof.

75. The soft contact lens according to claim 73, wherein said soft lens body comprises at least one discrete discontinuity selected from a channel, a fenestration, a groove, an opening, a slit, a thin portion, or any combination thereof.

76. The soft contact lens according to claim 73, having a young modulus that is <4 Mpa.

77. The soft contact lens according to claim 73, wherein said refractive error is astigmatism.

78. The soft contact lens according to claim 73, wherein refractive error is optical aberration of the eye.

79. The soft contact lens according to claim 73, wherein said soft lens body having an anterior surface, a posterior surface, and at least one fenestration traversing between the anterior surface and the posterior surface; wherein said at least one fenestration is positioned adjacent to a tear meniscus of the eye.

80. The soft contact lens according to claim 79, wherein said at least one fenestration is configured to be positioned adjacent a tear meniscus of the eye to promote flow of tear fluid therefrom to the free volume from adjacent the anterior surface of the lens body to the posterior surface of the lens body and to the free volume.

81. The soft contact lens according to claim 80, wherein said tear meniscus is one or more of an upper tear meniscus or a lower tear meniscus of the eye.

82. The soft contact lens according to claim 80, wherein the at least one fenestration is configured to be positioned adjacent to the tear meniscus to promote flow of tear fluid to the free volume irrespective of an orientation of the lens body to the tear meniscus, when the lens body is applied over the corneal surface with the eyelid of the eye open.

83. The soft contact lens according to claim 79, wherein said at least one fenestration is configured to be positioned adjacent to the tear meniscus to promote flow of tear fluid to the free volume.

84. The soft contact lens according to claim 79, wherein the at least one fenestration is configured to be positioned adjacent to the tear meniscus at a distance from about 0.0 mm to about 4 mm.

85. The soft contact lens according to claim 79, wherein said at least one fenestration is positioned from about 3 mm to about 9 mm from a center of the lens body.

86. The soft contact lens according to claim 79, comprising a plurality of fenestrations adjacent to a tear meniscus of the eye.

87. The soft contact lens according to claim 86, wherein the plurality of fenestrations is distributed circumferentially.

88. The soft contact lens according to claim 86, wherein the plurality of fenestrations is distributed radially.

89. The soft contact lens according to claim 86, wherein the plurality of fenestrations is distributed along at least one meridian of the soft lens body.

90. The soft contact lens according to claim 86, wherein the plurality of fenestrations is distributed along two meridians of the soft lens body, where the angle between them is between 45-135 degrees.

91. The soft contact lens according to claim 79, wherein said at least one fenestration has a length of about 40 µm to about 600 µm.

92. The soft contact lens according to claim 79, wherein said at least one fenestration has a cross-sectional area from about 0.0001 mm$^2$ to about 1 mm$^2$.

93. The soft contact lens according to claim 79, wherein said at least one fenestration has a cross-sectional area that is circular in shape.

94. The soft contact lens according to claim 79, wherein the at least one fenestration is positioned from about 3 mm to about 8 mm from a center of the lens body.

95. The soft contact lens according to claim 73, wherein said central portion extends from the center of the lens to a radius of about 3 mm to 7.5 mm.

96. The soft contact lens according to claim 73, wherein said peripheral portion extends starting at a radius from the center of the lens of about 3 mm to 8 mm.

* * * * *